Dec. 19, 1933.  J. B. HOWER  1,940,546
DUSTPAN
Filed Nov. 10, 1932

INVENTOR
JOHN B. HOWER

BY

ATTORNEYS

Patented Dec. 19, 1933

1,940,546

UNITED STATES PATENT OFFICE 1,940,546

DUSTPAN

John B. Hower, Akron, Ohio

Application November 10, 1932
Serial No. 642,058

2 Claims. (Cl. 65—63)

This invention relates to dust pans and particularly to dust pans of the foot operated type.

Heretofore foot operated dust pans have been provided including a handle defined by a loop of metal secured to the dust pan in which the foot may be engaged to position the dust pan to receive sweepings from the floor and upon which the pressure of the foot may be applied to yieldingly press the front edge of the pan snugly against the floor to facilitate brushing the sweepings into the pan.

This type of dust pan, however, has not been entirely satisfactory for the reason that the loop and pan become permanently distorted out of their proper relation with each other to effect the desired result. So far as we are aware, in all of the prior constructions both ends of the loop are secured to the pan and it seems that because of this the loop becomes permanently distorted with respect to the pan after a short time in service so that this function of the loop loses its effectiveness.

The purpose of the present invention is to provide a dust pan with a foot-operated, looped handle construction in which the bottom of the loop at its inner end is not connected with the pan and is adapted to be depressed by the foot to transmit its resilient force when depressed through the top portion of the loop to the pan effectively to press the front edge of the pan against the floor whereby the handle does not become distorted adjacent its connection with the pan and whereby any permanent distortion of the loop itself such as may occur after a considerable period of service may be easily remedied by bending the free or unconnected end of the loop back to its original position without in any way distorting the portion of the loop adjacent its connection with the pan and without distorting the pan itself.

The foregoing and other purposes of the invention are obtained in the dust pan illustrated in the accompanying drawing and described below. It is to be understood that the invention is not limited to the specific form thereof shown and described.

Of the accompanying drawing.

Figure 1:
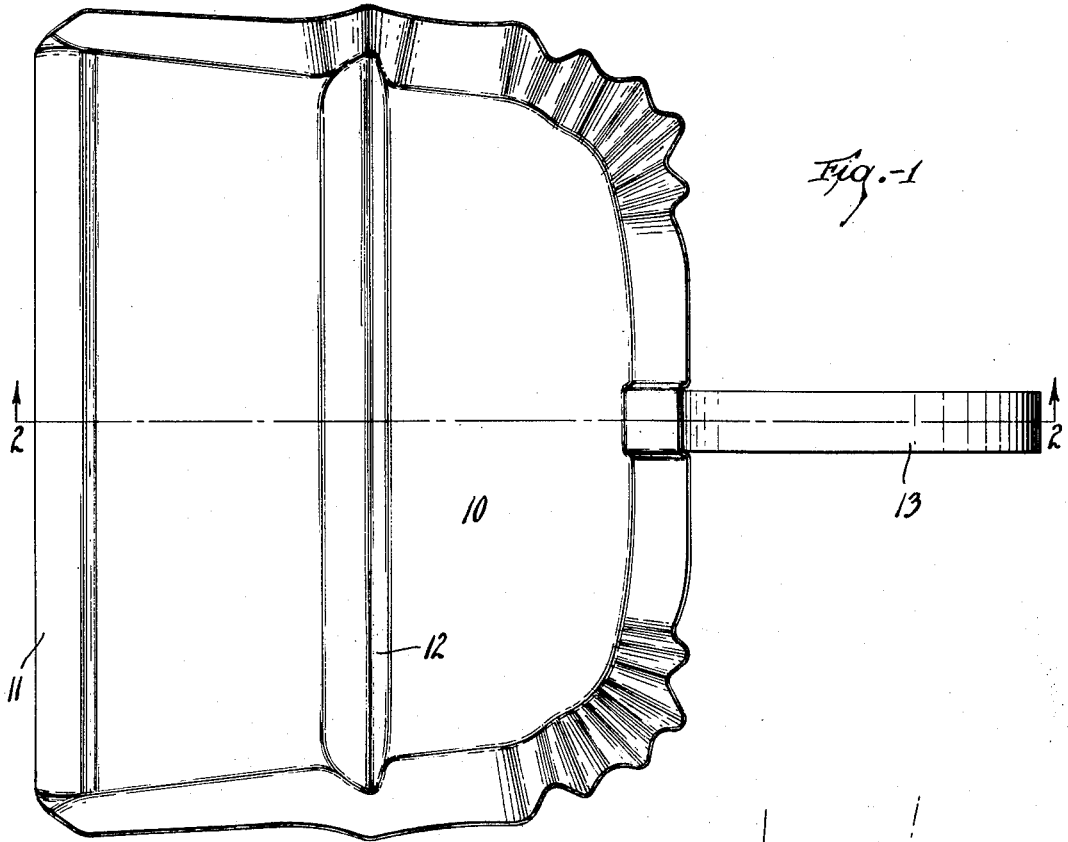
Figure 1 is a plan view of a dust pan embodying the invention.

Referring to the drawing, the numeral 10 designates the body of the pan with its front edge indicated at 11 and preferably having a ridge as at 12 formed therein above which sweepings may be brushed to be effectively retained by said rib in the upper section of the pan defined by said rib. A loop 13 of springy material such as resilient sheet metal is secured as at 14 by welding, riveting, or otherwise securing a downwardly extended portion of the loop to the back wall of the pan, the lower portion 15 of the loop having its end 16 free of the pan as shown, the loop being so shaped and so attached to the pan that the loop will engage the floor surface adjacent the rear of the loop as at 17 so as to support the dust pan in its usual inclined position with respect to the floor surface with its front edge 11 in contact with the floor surface and with the portion 15 extending at an inclination forwardly toward the back wall of the pan and providing a substantially closed loop permitting normal use of the loop as an ordinary handle.

Figure 2:
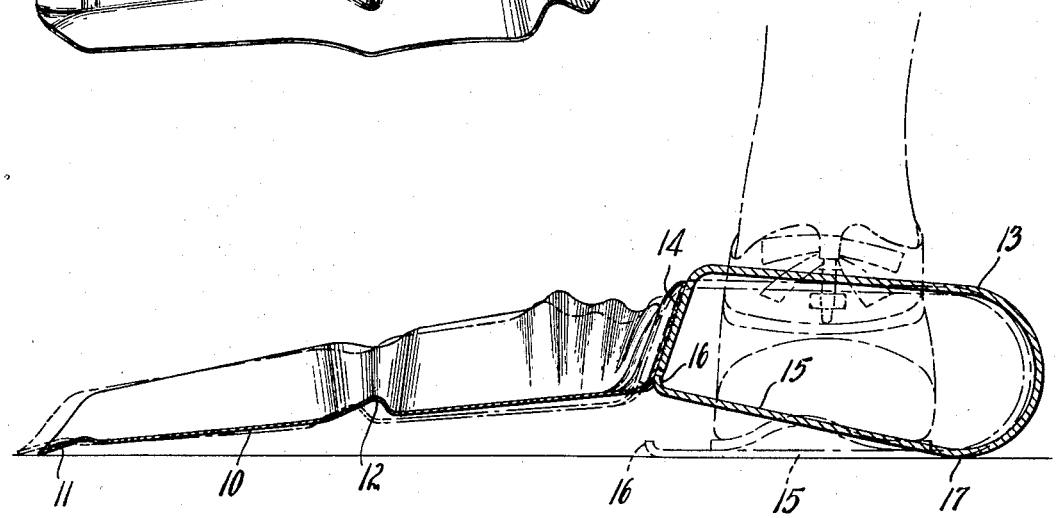
Figure 2 is a section on line 2—2 of Figure 1 showing in dotted lines the manner of operating the pan by the foot so as yieldingly to press the front edge of the pan against the floor surface.

By leaving the end of the upwardly directed lower portion 15 of the loop free, this portion of the loop may be depressed by the foot as shown in Figure 2, setting up a resilient force through the upper portion of the loop to the pan urging the front edge of the pan slightly forwardly and downwardly to the dotted line position shown in Figure 2, holding it tightly against the floor surface to receive sweepings. When the pressure on the portion 15 is released it returns to its original full-line position permitting the normal use of the loop as a handle. Should the portion 15 of the loop take a permanent set in a partly depressed position to reduce the effectiveness of the spring action of the loop after a period of use, it is a simple matter to squeeze the top and bottom of the loop together to reset the metal therein substantially in its originally formed condition. As will be apparent, there is no tendency in this construction to permanently distort the handle or the pan adjacent the connection of the handle with the pan.

Modifications of the invention may be resorted to without departing from the spirit thereof or the scope of the appended claims.

What is claimed is:—

1. A dust pan having a foot-operated handle attached thereto comprising a loop of springy material formed to rest adjacent its outer end on the surface of a floor to support the pan in an inclined position, the bottom of the loop having an upwardly directed portion extending from the outer end of the loop to the back of the pan, said portion being free of the pan whereby it may be depressed to set up a resilient force through the top of the loop to the pan to press the front edge of the pan against the surface of the floor, the free end of said upwardly directed portion normally assuming a position closely adjacent to the back of the pan to provide a substantially closed loop for normal use as a handle.

2. A dust pan having a foot-operated handle attached thereto comprising a loop of springy material formed to rest adjacent its outer end on the surface of a floor to support the pan in an inclined position, the bottom of the loop having an upwardly directed portion extending from the outer end of the loop to the back of the pan, said portion being free of the pan whereby it may be depressed to set up a resilient force through the top of the loop to the pan to press the front edge of the pan against the surface of the floor.

JOHN B. HOWER.